United States Patent [19]
Ikeuchi

[11] 3,885,750
[45] May 27, 1975

[54] PHOTOGRAPHIC FILM TAKE-UP SPOOL

[75] Inventor: Takeshi Ikeuchi, Osaka, Japan

[73] Assignee: Minolta Camera Kabushiki Kaisha, Osaka, Japan

[22] Filed: May 16, 1973

[21] Appl. No.: 360,729

[30] Foreign Application Priority Data
May 19, 1972 Japan............................. 47-59310
Aug. 25, 1972 Japan............................. 47-99033

[52] U.S. Cl. ............................................. 242/74
[51] Int. Cl. ............................................. B65h 75/28
[58] Field of Search ........... 242/74, 78.3, 74.1, 74.2

[56] References Cited
UNITED STATES PATENTS
3,439,881  4/1969  Ulmschneider.................. 242/74 X
3,614,013  10/1971  Kuramoto............................ 242/74

*Primary Examiner*—John W. Huckert
*Assistant Examiner*—John M. Jillions
*Attorney, Agent, or Firm*—Wolder & Gross

[57] ABSTRACT

A take-up spool in a camera using film with sprocket openings includes one or more cylindrical walls coaxial with the axis of the spool, the leading tongue section of a trailing wall section underlying and spaced inwardly from the trailing tail section of the next successive wall section in the direction of rotation of the spool in film take-up, the confronting faces of the tail and tongue sections delineating a film passageway. Projecting outwardly from each of the tongues shortly rearwardly of the end of the overlapping tail is a sprocket opening engaging tooth which extends to a point short of the plane of the outside face of the tail section. The upper edges of the walls converge upwardly from the ends of the walls to respective rounded apices and the edges are inwardly downwardly beveled. In one form the spool is provided with an axial shaft with a lower section of lesser diameter than the inside diameter of the wall sections and an enlarged upper section of a diameter equal to that of the wall section outside faces.

6 Claims, 13 Drawing Figures

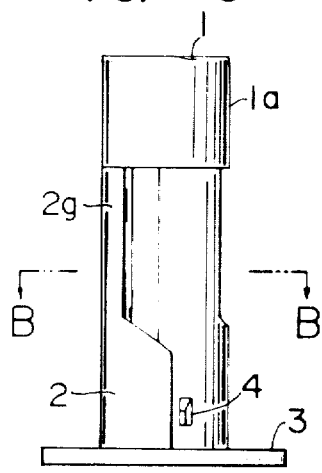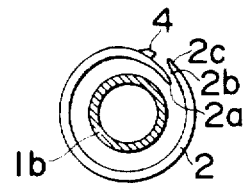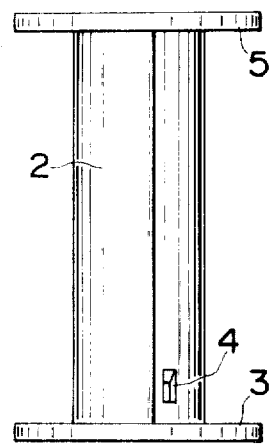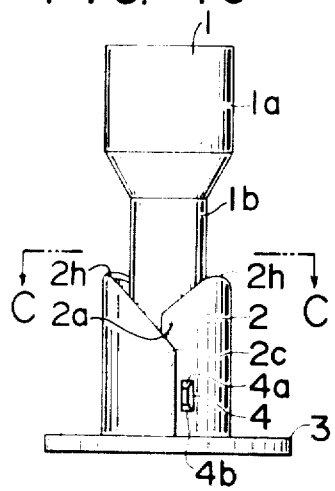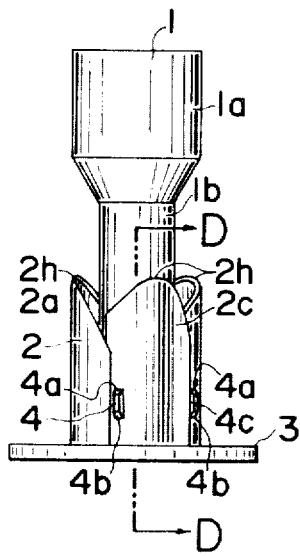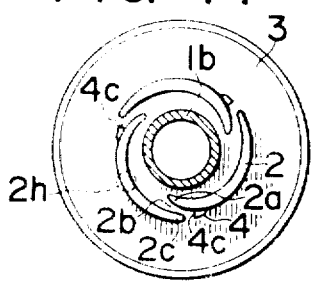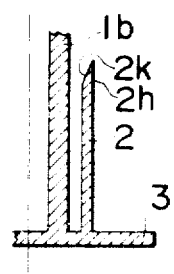

PHOTOGRAPHIC FILM TAKE-UP SPOOL

BACKGROUND OF THE INVENTION

The present invention relates to a photographic film take-up spool for use in a camera employing film with sprocket openings.

In the conventional photographic film take-up spool of the type provided with slits for receiving a leader portion of film around the outer periphery of the take-up cylinder, the take-up shaft has a double cylinder construction, and the outer cylinder is provided with one or more slits for guiding the leader portion of film to the spacing between the inner cylinder and the outer cylinder. In the spool of this type, for facilitating the insertion of the film leader portion into the spool, the upper half portion of said outer cylinder is cut away to open the slits upwardly, so as to facilitate the insertion of the leader portion of film from above.

The photograhic film take-up spool of the subject type, however, has been accompanied with many shortcomings since, because of the frictional force between the inner and outer cylinders being utilized for holding the leader portion of film, the film tends to slip off from the spool, and it frequently occurs that the leader portion of film is inserted in the wrong direction opposite to the film winding direction of the spool. If the film is wound around the spool under such a condition, the film leader portion is forced to bend sharply, resulting in damage to the film, and the consequent separation of the film from the spool. If the film leader portion is excessively inserted into the spool, the leading end of film leader portion received between the inner and outer cylinders frequently extends through another slit to the surface of the outer cylinder, and this not only interferes with the succeeding winding of the film, but also damages the film and leads to the interruption of the smooth operation in the camera.

Another type of spool is known, in which, for eliminating the shortcomings above described and for positively holding the film in position around the spool, there are provided teeth or pawls commensurate in number with slits on the outer surface of the outer cylinder of the spool, so that the pawls engage corresponding perforations on the film. The spool of this type has another disadvantage that pawls must be provided at a spacing conincident with that between perforations, and in such an arrangement of the pawls, with the progress of the winding of the film, the diameter of the wound film gradually increases because of a thickness of film, resulting in the displacement of the positions between the pawls and perforations. Consequently, projecting pawls abut against the film surface and exert an un-uniform tension upon the film in the succeeding travel of the film.

It is also known to provide pawls on the outer cylinder which project in the spacing between the inner and outer cylinders, and each pawl has a configuration continuous with a small slope to the outer surface of inner cylinder in the axial direction thereof and perpendicularly upright from the outer surface of inner cylinder in the direction along the periphery of said inner cylinder. With this construction, when the film is shifted in the axial direction of inner cylinder of the spool, the pawls tend to disengage from the perforations of the film, while in terms of the shift of the film in the circumferential direction of the inner cylinder of the spool, the disengagement of the film from the pawls fail, and there results a difficulty in the separation of the film from the spool after the termination of rewinding. In such case, the camera must be uncovered to manually force the film leader portion in the axial direction of the inner cylinder, so as to disengage the perforations from the pawls. Since the termination of the rewinding of the film is indicated only by the stop of the rotation of the rewinding lever, the erroneous sign provided by the accidental stopping of the rotation of the lever would be mistaken for the termination of the rewinding of the film, whereupon the user of the camera would open the camera for removing the film. In addition, in the termination of the rewinding of the film, a high tension is exerted upon the film and spool, resulting in damage to the film.

OBJECTS OF THE INVENTION

An object of this present invention is to provide a novel photographic film take-up spool which is free from the aforementioned shortcomings and capable of positively holding a film in place around the spool and which is simple to handle.

Another object of this invention is to provide a novel photographic film take-up spool which eliminates any likelihood of slipping a leader portion of a photographic film off from the spool in the winding of the film, and which easily automatically releases the film leader portion from said spool in the rewinding of the film.

A further object of this invention is to provide a novel photographic film take-up spool, in which a film surface and a surface of the take-up spool are maintained in close contacting relation uniformly throughout the surfaces, regardless of the volume of the film to be wound, and which eliminates any danger of exerting an uneven tension upon the film.

A still further object of this invention is to provide a novel film take-up spool, wherein the proper insertion of a leader portion of film is simplified and ensured.

SUMMARY OF THE INVENTION

In attaining the above objects described, there is provided a photographic film take-up spool having a film holding member serving as a take-up cylinder which comprises one or more bent pieces constituting a cylindrical member serving as a film holding member, the bent pieces being disposed in a manner such that a rear portion of one bent piece in relation to the film winding direction overlaps and is spaced from a portion of the other bent piece adjacent thereto; each of the bent pieces being provided with a pawl or tooth at a portion adjacent to said front portion of the succeeding bent piece and uncovered by said rear portion of the succeeding bent piece, and said pawl being adapted to engage a film perforation or sprocket opening. The film holding member, may be constituted by a single bent piece or by a plurality of bent pieces.

The film holding member in a film take-up spool embodying the present invention consists of an inner cylinder and an outer cylinder, the outer cylinder being composed of bent pieces surrounding the inner cylinder. The bent pieces are disposed in an overlapping manner, a rear end portion of one bent piece overlying and spaced outwardly from a front end portion of the other bent piece adjacent thereto, the spacing between the overlapping portions defining a passageway for film. A pawl is provided at a portion near to the front end of each bent piece and is out of registry with and spaced proximately from the rear end of the preceding bent piece and adapted to engage a perforation on the film. An upper portion of each bent piece is upwardly tapered to a rounded apex.

An important feature of the present invention resides in that in the winding of the film, the coupling of the film to the spool is ensured and simplified, and in the rewinding, the film is separated with ease from the spool, automatically upon the termination of the rewinding.

Another feature of the present invention resides in that, due to the fact an outer cylinder of the film holding member is constituted by plurality of bent pieces disposed in partly overlapped relation with one another and a pawl is provided at a portion adjacent to the front end of each bent piece and does not project outwardly of the plane of the outer circumference of the rear portion of the succeeding bent piece and an outer periphery of the front portion of preceding bent piece, the film is wound around the spool, with the whole surface in the transverse direction thereof being uniformly maintained in close contact with the bent pieces.

A further feature of the present invention lies in that since the opening formed between the rear end portion of one bent piece and the front end portion of the other bent piece succeeding thereto is directed in the direction of film taking-up rotation of the spool, there is no danger of inserting the leader portion of film in the wrong direction adverse to the film winding direction of the spool, and the film can be wound in the absence of any sharp curvature and free from being forcibly bent.

A still further feature of this invention exists in that bent pieces of the spool of this invention each have an upper portion tapering to a curved apex or ridge, and this facilitates the insertion of the film leader portion into the spool.

These and other objects and features of this invention will be more apparent from the following description.

BRIEF DESCRIPTION OF THE DRAWINGS

FIG. 6 is a side elevation view showing a second form of the film take-up spool embodying the present invention;

FIG. 7 is a cross-sectional view taken along the line B—B of FIG. 6;

FIG. 8 is a side elevational view of a photographic film take-up spool showing a third embodiment of the present invention;

FIG. 9 is a transverse cross-sectional view thereof;

FIG. 10 is a side elevation of a film take-up spool constituting a fourth embodiment of the present invention;

FIG. 11 is a cross-sectional view taken along the line C—C of FIG. 10;

FIG. 12 is a side elevational view of the same, as seen from an angle different from FIG. 10; and, FIG. 13 is a cross-sectional view taken along the line D—D in FIG. 12.

DESCRIPTION OF THE PREFERRED EMBODIMENTS

Figure 1:
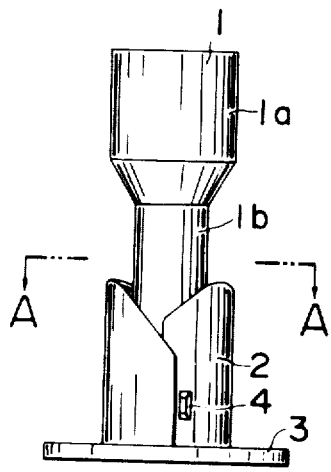
FIG. 1 is a side elevational view of a photographic film take-up spool according to a first embodiment of the present invention.
Figure 2:
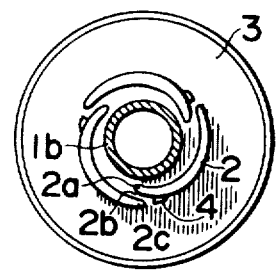
FIG. 2 is a cross-sectional view taken along the line A—A of FIG. 1.
Figure 3:
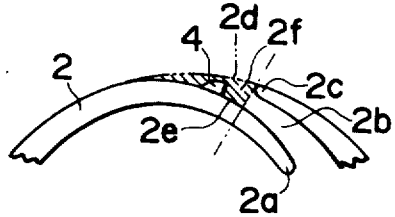
FIG. 3 is an enlarged view of an essential part of FIG. 2.
Figure 4:
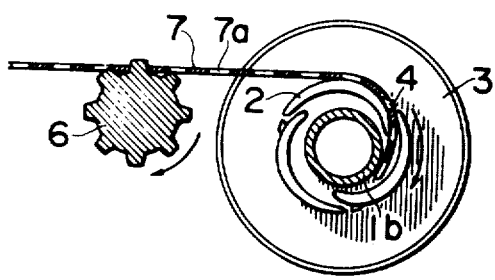
FIG. 4 is a transverse cross-sectional view illustrating the way of guiding the film to the spool in the first embodiment.

Referring now to the drawings and particularly FIGS. 1 through 5 thereof which show a first embodiment of the present invention, the reference numeral 1 generally designates an inner cylinder of a film take-up spool, said inner cylinder having a diametrically enlarged portion 1a having a diameter equal to an outer cylinder and a diametrically reduced portion 1b. Shown at 2 are curved or bent pieces surrounding the reduced portion 1b to constitute the outer cylinder and serving as a film holding member, the bent pieces being attached to a flange 3 and being arranged in an overlapping manner with the tail or rear end 2c of one bent piece spaced outwardly of and overlapping a front end or tongue 2a of the other bent piece adjacent thereto to delineate a passage or an opening 2b therebetween. A pawl or tooth 4 projects outwardly from the outer face of each bent piece 2 in the area of the tongue section 2a and proximate and rearwardly of the end of the respective tail section 2c and lies within the space or region 2f delineated by the outside face of the trailing bent piece 2 and the plane of the outside face of the trailing portion of the leading bent piece 2 so that the tooth 4 does not extend beyond the inside face of film wound upon cylinder enlarged portion 1a and bent pieces 2. The outside winding faces of bent pieces 2 and cylinder enlarged portion 1a are substantially coplanar and of equal diameters.

Figure 5:
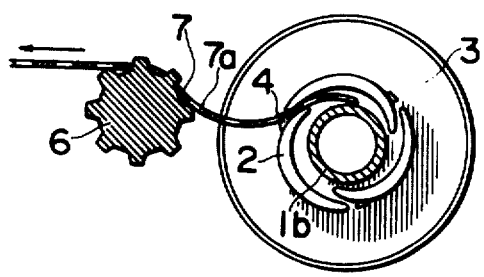
FIG. 5 is a transverse cross-sectional view illustrating the way of removing the film from the spool in the rewinding of the film.

In coupling a photographic film 7 to the take-up spool described above, the leader portion of film is inserted from above or from the side to one of the openings 2b with one of the perforations 7a of the film engaging the pawl 4. At this stage, if the pawl 4 fails to engage a film perforation, the pawl is easily brought into engagement with a succeeding perforation merely by moving the film in a longtitudinal direction. In winding the film around the spool, because of the leading end of leader portion of film registers with the opening 2b, the film 7 is rendered bent along the arcuate periphery of bent pieces, against its own resiliency and pressed on the bent pieces, and this serves to provide a positive engagement of the pawl 4 with the film perforation 7a whereby the film is securely retained on the spool. On the other hand, in rewinding and withdrawing the film, the spool is rotated along with the travel of the film 7, as shown in FIG. 5, and upon the termination of the rewinding, the film 7 is retracted in the direction of separation from the spool, whereby the engagement of the pawl with the perforation is automatically released.

FIGS. 6 and 7 show a second embodiment of the present invention, wherein each bent piece 2 has a portion 2g extending in the longitudinal axial direction to the diametrically enlarged portion of 1a of inner cylinder 1. The spool of this embodiment possesses the advantage in that the whole surface of the film in the crosswise direction is uniformly brought into close contact with the outer periphery of the spool, and this serves to normally maintain the film in a flattened state.

In the third embodiment as shown in FIGS. 8 and 9, a bent piece 2 extends upwardly to reach at its upper end an upper flange 5, with the diametrically enlarged portion 1a of inner cylinder 1 being omitted. In winding the film around the spool, the leader portion of film can be inserted from the side as in the usual manner, with the pawl being positively engaged with a perforation on the film, free from any danger of disengagement of the pawl therefrom, and in the rewinding of the film, the perforation is easily released from the pawl.

The outer cylinder may be constituted by a single bent piece 2, as best seen in FIG. 9. In case of the aforementioned embodiment, the inner cylinder 1 is not needed, and for the sake of simplification in the construction, the inner cylinder 1 may be omitted.

FIGS. 10 through 13 illustrate the fourth embodiment. This embodiment includes substantially identical components with those shown in FIGS. 1 and 2, which are shown with the identical reference numerals. Designated at 1 is an inner cylinder of a photographic film take-up spool having a diametrically enlarged portion 1a with a diameter substantially equal to an outer diameter formed by bent pieces 2 constituting an outer cylinder, and a diametrically reduced portion 1b. Shown at 2 are bent pieces surrounding the diametrically reduced portion 1b and serving as an outer cylinder, the bent pieces being attached on the flange 3 in a manner so that the bent pieces are in of overlapping relationships, a rear end of one bent piece overlying a front end portion of the adjacent bent piece, with a spacing or an opening therebetween. Each bent piece 2, as best seen in FIG. 12 showing the state of the spool viewed from a different angle from FIG. 10, has a rounded apex or mountain shaped upper portion having a top or apex 2h extending upwardly in the axial direction and diverging inclined edges extending downwardly from the top towards the front and rear end portions 2a and 2b of the bent piece. Shown at 4 are pawls each provided at a portion adjacent to the front end portion of each bent piece and out of radial registry with and uncovered by the rear portion of the adjacent bent piece and adapted to engage a perforation of the film for ensuring the film retention on the spool.

With the above structure, the direction of inserting the leader portion of the film is limited, and this prevents the insertion of the film in the wrong direction, because the insertion of the film in the direction adverse to the direction of the opening is practically impossible. Accordingly, the leader portion of film is necessarily inserted in the rotational direction of the spool for winding the film, and after the insertion of the leader portion in the spool, the film is transferred with a slow curve to be wound around the spool, free from being forcibly bent. Should the leader portion of film be inserted diagonally in the spool, the leader portion becomes curved along the inner surface of bent piece 2, because of the leader portion being sandwiched between the cylinder 1b and the bent pieces 2, and the leading end of leader portion of the film rides on an inclined ridge 2h–2a extending between the top 2h of the overlying bent piece and the front end 2a of the underlying bent piece, whereupon the leading end of the leader portion of the film is slidingly forced downwardly along the inclined ridge by the force of urging the film downwardly in the axial direction into a position in the opening between the bent piece 2 and the inner cylinder 1b. When the leader portion of the film is located in place in said opening, the perforation of the film assumes a position in alignment on the pawl 4, thereby engaging the pawl. For facilitating the engagement of the pawl with the perforation of the film, the pawl 4 projecting from the bent piece of the spool has upper and lower portions 4a and 4b as seen in the axial direction of the spool which are somewhat inclined in relation to the bent piece and perpendicularly upright lateral portions 4c extending from the outer periphery of bent piece 2.

It is apparent that in inserting the film in the spool, the inclined edge 2h–2a serves to smoothly guide the leading end of leader portion of film between said bent piece 2 and the inner cylinder 1b.

As shown in FIGS. 10 and 12, more particularly in FIG. 13 which is a cross-section taken along the line D—D, the inner face of the inclined upper ridge or edge of each bent piece 2 is tapered outwardly as at 2k whereby the leading end is smoothly slid along the tapered inner face 2k to a position between the bent piece and the inner cylinder.

It will be apparent to those skilled in the art that various changes and modifications may be made without departing from the spirit or the scope of this invention.

I claim:

1. A take-up spool for film having perforations comprising a lower base member rotatable in a forward film take-up direction about a vertical axis and located at an end of said spool, a first wall section extending upwardly from said base member parallel to said axis and having an outer cylinderical face and a tail section projecting peripherally, rearwardly, relative to said forward rotation of said base member and having an upper edge which is upwardly, peripherally inclined from the rear end of said tail section, a second wall section extending upwardly from said base member parallel to said axis and having an outer cylindrical face and a tongue section projecting peripherally forwardly beneath and spaced inwardly of said tail section a film perforation engaging tooth projecting radially, outwardly from said second wall section spaced proximate to and rearwardly of the rear end of said tail section and extending outwardly to a point inwardly of a cylindrical plane extending between the outer faces of said wall section, and a shaft extending from said base member above the top of and surrounded by said wall sections and having a peripheral face spaced inwardly from the inside faces of said wall sections.

2. The take-up spool of claim 1 wherein said shaft includes an enlarged portion disposed above the top of said wall sections and having a peripheral face lying in the curved plane of the outside faces of said wall sections.

3. The take-up spool of claim 1 wherein the upper edge of said tail section is downwardly, radially inwardly bevelled.

4. A photographic film take-up spool having a film holding member comprising:
   a base member forwardly rotatable in a film take-up forward direction about an axis perpendicular to said base member;
   a plurality of bent pieces having substantially cylindrical outer faces mounted on and rotatable with said base member and surrounding said axis, each of said bent pieces having rear and forward portions disposed respectively at the rear and front thereof relative to said film take-up forward direction of rotation of said base member and a portion intermediate said forward and rear portions thereof elongated in the axial direction of the spool compared to both front and rear edge portions for forming a mountain-shaped apex on part of said intermediate portion remote from said base member, the rear portion of each of said bent pieces overlapping the forward portion of the next rearwardly disposed bent piece and spaced radially outwardly thereof;

a pawl member projecting radially outwardly from the forward portion of each of said bent pieces at a point proximate the rear edge of the next forwardly succeeding bent piece and disposed radially inwardly of the outer face of said rear portion, said pawl being adapted to engage a perforation of the film to be wound; and an inner cylindrical shaft mounted on and projecting from said base member and coaxial with said axis and surrounded by said bent pieces, the peripheral face of said shaft being spaced radially inwardly of the inside faces of said bent pieces.

5. A photographic film take-up spool as claimed in claim 4, wherein each bent piece has an end border remote from said base member with an inner periphery tapered radially outwardly towards the upper extremity of the bent piece.

6. A photographic film take-up spool as claimed in claim 4, wherein said inner cylindrical shaft has a diametrically enlarged portion equal to a radius defined by the outer peripheres of said bent pieces.

* * * * *